(12) United States Patent
Woodworth et al.

(10) Patent No.: US 12,341,683 B2
(45) Date of Patent: *Jun. 24, 2025

(54) ROUTER FLUIDITY USING TUNNELING

(71) Applicant: Level 3 Communications, LLC, Denver, CO (US)

(72) Inventors: John R. B. Woodworth, Amissville, VA (US); Dean Ballew, Sterling, VA (US); Brian J. Strong, St. Louis, MO (US); Stewart Bamford, Cambridgeshire (GB)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,106

(22) Filed: Jul. 11, 2024

(65) Prior Publication Data

US 2024/0364617 A1   Oct. 31, 2024

Related U.S. Application Data

(63) Continuation of application No. 17/657,226, filed on Mar. 30, 2022, now Pat. No. 12,040,964.

(60) Provisional application No. 63/171,991, filed on Apr. 7, 2021.

(51) Int. Cl.
| | |
|---|---|
| *H04L 45/12* | (2022.01) |
| *H04L 45/00* | (2022.01) |
| *H04L 45/42* | (2022.01) |
| *H04L 47/122* | (2022.01) |
| *H04L 47/125* | (2022.01) |

(52) U.S. Cl.
CPC ............ *H04L 45/123* (2013.01); *H04L 45/22* (2013.01); *H04L 45/42* (2013.01); *H04L 47/122* (2013.01); *H04L 47/125* (2013.01)

(58) Field of Classification Search
CPC ..... H04L 47/125; H04L 47/122; H04L 45/42; H04L 45/22; H04L 45/123
See application file for complete search history.

(56) References Cited

U.S. PATENT DOCUMENTS

| | | | |
|---|---|---|---|
| 7,088,718 B1 | 8/2006 | Srivastava | |
| 7,512,702 B1 * | 3/2009 | Srivastava | .............. H04L 45/00 709/239 |
| 9,350,706 B1 * | 5/2016 | Smith | ................. H04L 63/1458 |
| 10,033,627 B1 | 7/2018 | Howard | |
| 11,336,573 B2 | 5/2022 | Janakiraman | |
| 2003/0105865 A1 | 6/2003 | McCanne et al. | |
| 2009/0182894 A1 | 7/2009 | Vasseur | |
| 2013/0339544 A1 | 12/2013 | Mithyantha | |
| 2015/0078152 A1 | 3/2015 | Garg | |
| 2016/0057659 A1 | 2/2016 | Hoshihara | |

(Continued)

FOREIGN PATENT DOCUMENTS

WO   WO-2015192001   12/2015

OTHER PUBLICATIONS

Gales, Ema-Maria et al., "Layer 3 VPNv4 Traffic Balancing Mechanism Scenario", *IEEE* 2018 International Conference on Communications (COMM); Conference Paper, pp. 313-318.

*Primary Examiner* — Oleg Survillo

(57) ABSTRACT

The present application describes a system and method for utilizing a tunnel in a networking routing protocol to provide a network segment access to additional servers when certain load balancing trigger events are detected.

11 Claims, 7 Drawing Sheets

(56) References Cited

U.S. PATENT DOCUMENTS

| | | |
|---|---|---|
| 2016/0119255 A1 | 4/2016 | Luo |
| 2016/0241590 A1 | 8/2016 | Smith |
| 2018/0375828 A1 | 12/2018 | Rawat |
| 2019/0109729 A1 | 4/2019 | De Luca |
| 2020/0076766 A1 | 3/2020 | Maslak |
| 2020/0128071 A1 | 4/2020 | Boyd |
| 2020/0280605 A1 | 9/2020 | Merino Vazquez |
| 2021/0211371 A1 | 7/2021 | Ceccarelli |
| 2022/0103525 A1 | 3/2022 | Shribman |
| 2022/0171649 A1 | 6/2022 | Green |
| 2022/0191139 A1 | 6/2022 | Dutta |
| 2022/0329513 A1 | 10/2022 | Woodworth |

* cited by examiner

ROUTER FLUIDITY USING TUNNELING

BACKGROUND

Anycast is a network routing protocol in which a single address is associated with a number of different servers and different routing paths. A router will select a routing path based on various factors. These factors may include a number of hops from a source to a destination, topographical distance of servers, and a cost associated with utilizing the servers. However, in some instances, a server associated with an Anycast network may become congested, be over utilized, and/or be the target of a network attack. As a result, performance of the network may be negatively impacted.

SUMMARY

The present application describes a system and method for utilizing a logical tunnel in a networking routing protocol to dynamically provide a network segment with additional network resources (e.g., additional servers or other resources) when a load balancing trigger event is detected. In contrast to current Anycast procedures in which remote servers are not accessible to Anycast network segments, in the examples described herein, network resources associated with an Anycast network segment, or the Anycast network segment, may utilize logical tunnels and remote servers to route network traffic even though the remote servers are topographically and/or geographically remote.

For example, when a load balancing trigger event is detected, a logical tunnel is created between a remote router (e.g., a router associated with a server farm having one or more remote servers) and a local router associated with the network segment. The logical tunnel enables a remote server to be logically associated with the network segment. In an example, the remote server provides information (e.g., an advertisement) via the logical tunnel, to the network segment and/or the local router notifying the network segment and/or the local router that the remote server is available to route network traffic. The advertisement causes the network segment and/or the local router to consider the remote server as a local network resource. As such, the network segment may load balance network traffic between the remote server and local servers already associated with the network segment and/or a particular IP address.

Accordingly, the present application describes a method for load balancing an Anycast network. In an example, the method includes monitoring a network segment in the Anycast network. The network segment may be associated with one or more network resources such as a first router and a first server. When a load balancing trigger event for the network segment is detected, a logical tunnel between the first router and a second router is created. In an example, the second router is remote from the first router and is associated with a second server. The logical tunnel enables the second server to be logically associated with the first router. The first router identifies the second server as a local server such that the first server and the second server have an equivalent route metric.

The present application also describes a system comprising a network segment, a local router associated with the network segment, a first server associated with the local router, and a control server. The control server monitors performance characteristics associated with the network segment. Based on determining that the performance characteristics associated with the network segment fall below a threshold, the control server causes creation of a logical tunnel between the local router and a remote router. In an example, the remote router is associated with at least a second server. Creation of the logical tunnel causes the second server to be logically associated with the local router. As such, the local router is able to load balance network traffic using the first server and the second server.

Also described is a method for associating a remote resource with a network segment. In an example, a network segment is monitored. The network segment is associated with a local router that routes network traffic to a first server. When a load balancing trigger event associated with the first server is detected, a logical tunnel between the local router and a remote router is created. In an example, the remote router is associated with at least a second server. The second server is logically associated with the local router and the local router routes network traffic associated with the network segment to the second server.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
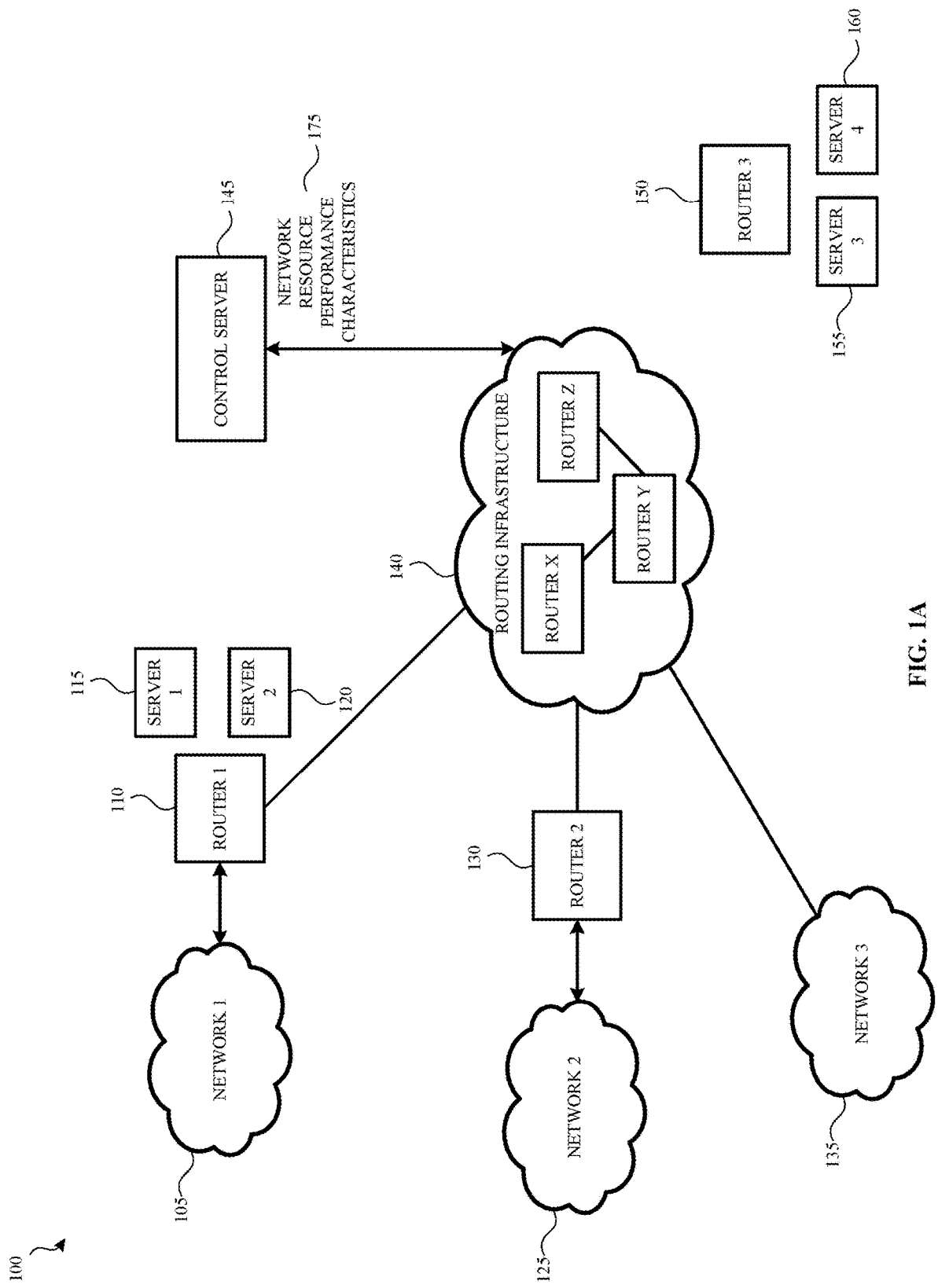
FIG. 1A illustrates an example networking system in which examples of the present disclosure may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Anycast networks and various network segments of the Anycast networks are comprised of various network resources. Network resources may include routers and servers. In an example, each server associated with a network segment shares the same IP address. When a network segment transmits and/or receives data via the network resources, the network segment uses servers that are topographically and/or geographically closest to the network segment. Use of servers that are topographically/geographically closest to the network segment helps reduce and/or minimize administrative costs (e.g., bandwidth costs, number of hops) of the Anycast network. As a result, load times and network availability for end users is improved.

However, in some instances, a server associated with a network segment (or a particular IP address) may become congested and drop packets. In another example, the server may be a target of a network attack. As a result, latency may increase, thereby negatively impacting the overall performance of the networking system.

As explained above, in current Anycast networking systems, a particular network segment utilizes servers that are topographically/geographically closest to the networking segment when routing network traffic. However, this becomes problematic when, as the example above explains, the server(s) associated with the network segment are under attack or become congested, overwhelmed, etc.

The present application describes the creation and use of logical tunnels between various network resources of the Anycast networking system. The logical tunnel enables a server that is geographically and/or topographically remote from a network segment and its associated network resources (e.g., a local router, a local server) to appear to the network segment, and to the network resources, as an additional "local" network resource. As such, a local router associated with the network segment may load balance network traffic between the remote server and any local server(s) associated with the network segment.

In an example, the remote server may provide an advertisement or other such notification to the local router associated with the network segment. The advertisement may indicate that any administrative costs or route metrics associated with using the remote server, via the logical tunnel, to route network traffic appear to be or are otherwise equivalent to any administrative costs or route metrics associated with using the local servers.

In an example, the advertisement may be included in or otherwise associated with a Border Gateway Protocol (BGP) advertisement provided by the remote server. Information associated with the advertisement (e.g., an Anycast network IP address) may be provided by the local router during or as part of the logical tunnel creation process between the local router and the remote router. In another example, the information associated with the advertisement may be provided by a monitoring system that detects a load balancing trigger event that ultimately causes the creation of the logical tunnel. When the remote server is logically associated with the local router, the local router may load balance network traffic between the local server(s) and the remote server.

Although the examples herein are described with respect to an Anycast network, the examples may be applied to various types of network routing protocols. These and other examples will be explained in more detail below with respect to FIG. 1A-FIG. 4.

FIG. 1A illustrates an example networking system 100 in which examples of the present disclosure may be practiced. The example networking system 100 may be an Anycast networking system although other networking systems are contemplated.

The networking system 100 may include a number of different network segments and network resources. For example, and as shown in FIG. 1, the networking system 100 includes three network segments identified as Network 1 105, Network 2 125 and Network 3 135. Although three network segments are shown and described, the networking system 100 may include any number of network segments.

Each network segment may be associated with or otherwise have access to different network resources such as various routers and/or servers. For example, Network 1 105 is associated with Router 1 110, Server 1 115 and Server 2 120. Network 2 125 is associated with Router 2 130. In this example, Network 3 135 is not associated with any local network resources. In an example, Server 1 115 and Server 2 120 are associated with a particular IP address.

The networking system 100 may also include a routing infrastructure 140. The routing infrastructure 140 may include a number of different routers represented as Router X, Router Y and Router Z. The routing infrastructure 140 enables the various network segments to access other parts of the networking system 100.

For example, although Network 3 135 is not associated with any local routers or local servers, Router 1 110, Server 1 115 and/or Server 2 120 may indirectly service requests (e.g., requests for the particular IP address) to and from Network 3 135 via the routing infrastructure 140. Likewise, although Network 2 125 is not associated with any local servers, Router 1 110, Server 1 115 and/or Server 2 120 may indirectly service Network 2 125 via Router 2 130 and the routing infrastructure 140.

The networking system 100 may also include additional routers (e.g., Router 3 150) and additional servers (e.g., Server 3 155 and Server 4 160). Router 3 150, Server 3 155 and Server 4 160 may be part of or otherwise associated with a server farm and be geographically and/or topographically remote from the various network segments and their associated network resources. Due to the topographic and/or geographic distance of these additional routers and servers from the various network resources, a typical Anycast system would not be able to use or even recognize the presence of these additional routers and servers. However, as will be described in more detail below, Server 3 155 and/or Server 4 160 may be logically associated with various network resources and various network segments in response to a detection of a load balancing trigger event. As such, network resources in an Anycast system (or in other networking systems) may dynamically utilize these additional network resources to load balance network traffic.

The networking system 100 also includes a control server 145. The control server 145 monitors the various network resources and/or network segments to identify network resource performance characteristics 175. The network resource performance characteristics 175 provide information as to whether various servers (e.g., Server 1 115 and/or Server 2 120) in the networking system 100 are: overloaded; dropping data packets; under attack; or otherwise not meeting performance thresholds. For example, the control server 145 may monitor various links between Router 1 110 and Server 1 115, may monitor various links between Router 1 110 and Server 2 120 and/or may monitor workloads of Server 1 115 and/or Server 2 120 to determine whether these servers are overloaded or whether they are meeting performance thresholds. If the servers are not meeting performance thresholds, the control server 145 trigger a load balancing trigger event that indicates Server 1 110 and/or Server 2 120 are currently overwhelmed or are otherwise not performing efficiently.

Identification of a load balancing trigger event causes the control server 145 to provide instructions to various routers within the networking system 100 to create logical tunnels through which remote servers can be utilized by particular network resource(s) and/or network segments. When the logical tunnel is created, the particular network resource may utilize the remote server(s) to route network traffic to the particular IP address associated with Server 1 115 and Server 2 120.

Figure 1B:
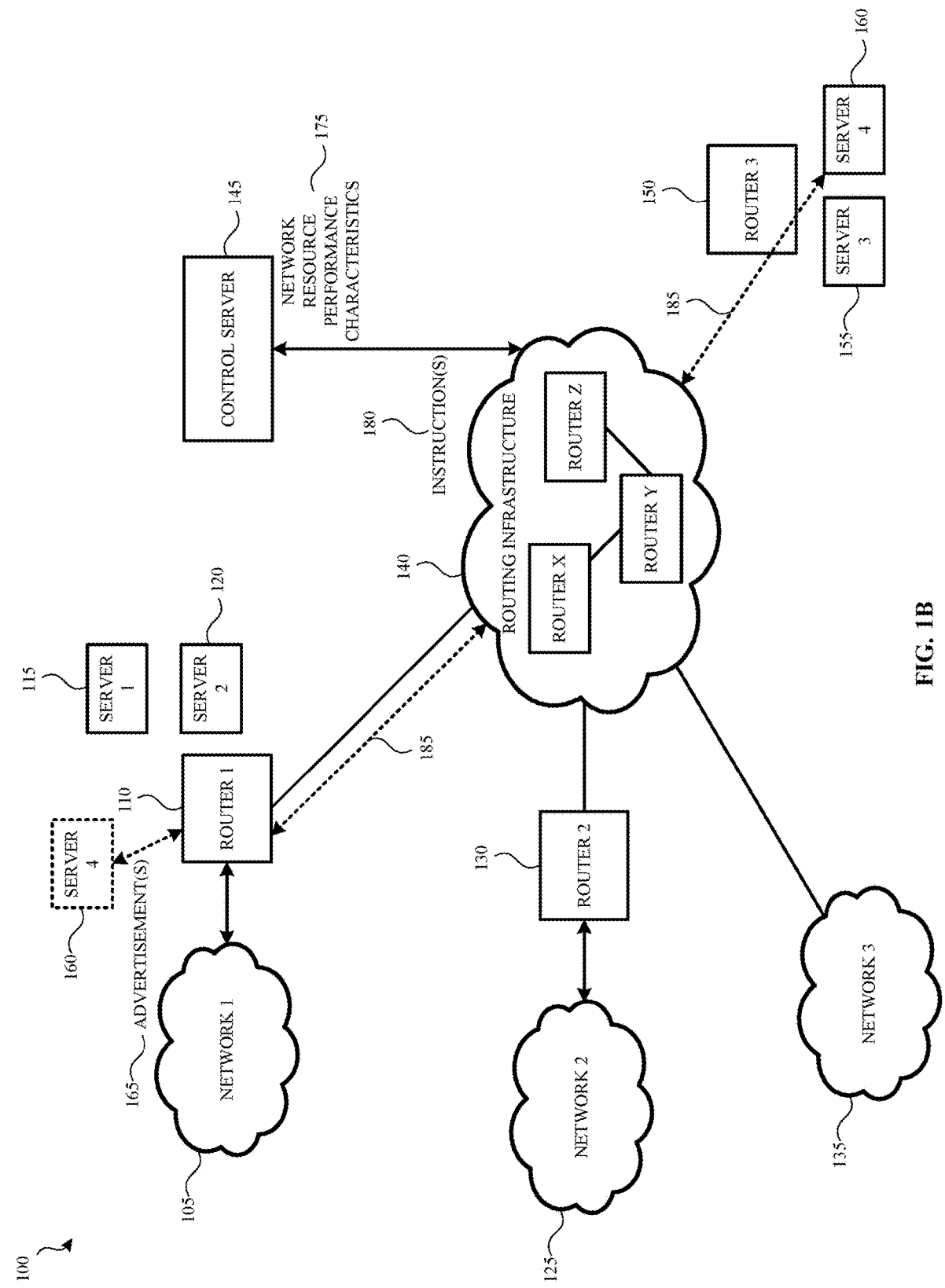
FIG. 1B illustrates the example networking system of FIG. 1A in which a logical tunnel is constructed between a local router associated with a first network segment and a remote router to provide an additional server to the local router associated with the first network segment according to an example.

For example and referring to FIG. 1B, FIG. 1B illustrates the networking system 100 of FIG. 1A in which a logical tunnel (represented by dashed line 185) is constructed between a local router (e.g., Router 1 110) associated with a first network segment (e.g., Network 1 105) and a remote router (e.g., Router 3 150) to provide an additional server (e.g., Server 4 160) to the local router associated with the first network segment according to an example.

In the example shown in FIG. 1B, the control server 145 determines, based on received network resource performance characteristics 175 associated with Network 1 105, that Server 1 115 and/or Server 2 120 are not meeting minimum threshold performance metrics or are otherwise overwhelmed. As such, a load balancing trigger event is detected.

For example, the control server 145 may determine, based on network resource performance characteristics 175, that latency associated with Server 1 115 and/or Server 2 120 is above a latency threshold. In another example, the network resource performance characteristics 175 may indicate that Server 1 115 and/or Server 2 120 are dropping more than a threshold number of packets. In another example, the network resource performance characteristics 175 may indicate that Server 1 115 and/or Server 2 120 are under a network attack. Although specific network resource performance characteristics 175 are mentioned, these are for example purposes only and the network resource performance characteristics 175 may include various types of performance characteristics.

Based on the control server 145 detecting a load balancing trigger event using the network resource performance characteristics 175, the control server 145 sends an instruction 180 to Router 1 110 and Router 3 150. The instruction 180 causes Router 1 110 and Router 3 150 to create a logical tunnel (represented by dashed line 185) between the routers. The logical tunnel may be protocol agnostic. As such, the logical tunnel may be built using any tunneling protocol such as, for example, IP in IPv4/IPv6 (IP in IP), Generic Routing Encapsulation (GRE), Multiprotocol Label Switching (MPLS), etc.

In some examples, the logical tunnel extends through one or more routers of the routing infrastructure 140. In the example shown in FIG. 1B, the logical tunnel enables Server 4 160 to appear to Router 1 110 and/or Network 1 105 as a local network resource even though Server 4 160 may not be geographically and/or topographically close to Network 1 105. Thus, Router 1 110 may load balance and route network traffic to Server 1 115, Server 2 120 and Server 4 160.

In order for Router 1 110 to view Server 4 160 as a local network resource, Server 4 160 provides an advertisement 165 to Router 1 110. The advertisement 165 indicates that Server 4 160 will respond to requests for a particular IP address (e.g., an Anycast IP address). In an example, the advertisement 165, and the information included in the advertisement 165, may be included in or otherwise associated with a BGP advertisement broadcast by Sever 4 160. In another example, information (e.g., IP address information) associated with the advertisement 165 may be provided by the control server 145. In yet another example, the IP address information associated with the advertisement 165 may be provided by the Router 1 110 during, or as part of, the logical tunnel creation process between Router 1 110 and Router 3 150. In an example, when Router 1 110 receives the advertisement 165, Router 1 110 may forward the information associated with the advertisement 165 to Network 1 105.

For example, Server 1 115 and Server 2 120 may provide advertisements to Router 1 110 that Server 1 115 and Server 2 120 respond to any request associated with a particular IP address. In this example, the IP address is 4.2.2.2. Router 1 110 advertises an IP address of 4.0/8 to Network 1 105 and/or to other network segments in the networking system 100 indicating that it will route network traffic to the IP address 4.2.2.2. As a result of the advertisement from Router 1 110, any computing device in Network 1 105 (or in Network 2 125 or Network 3 135) that wants to reach the IP address 4.2.2.2 knows to contact Router 1 110. In this example, Router 1 110 has two local network resources (Server 1 115 and Server 2 120) that have equal or substantially equal administrative costs/route metrics.

If the network resource performance characteristics 175 associated with Server 1 115 and/or Server 2 120 trigger a load balancing trigger event and a logical tunnel is created between Router 3 150 and Router 1 110, Server 4 160 may, via the logical tunnel between Router 3 150 and Router 1 110, appear as an additional local resource to Router 1 110 and Network 1 105. However, in order to be viewed as a local resource, Server 4 160 advertises, via the logical tunnel, that it takes requests for the IP address 4.2.2.2. Additionally, the advertisement 165 informs Router 1 110 that the administrative cost of utilizing Server 4 160, via the logical tunnel, is the same as the administrative cost of using Server 1 115 and Server 2 120.

In an example, the administrative cost information and the IP address information may be determined or otherwise provided by Router 1 110 when the logical tunnel is being built between Router 1 110 and Router 3 150. In another example, the control server 145 may provide the administrative cost to Server 4 160 to enable Server 4 160 to provide this information in its advertisement 165. As a result of the above, Router 1 110 will determine that there are now three servers having an equivalent route metric to which network traffic may be routed for the IP address 4.2.2.2.

The control server 145 may periodically monitor network resource performance characteristics 175 associated with a network segment. In another example, the control server 145 may continuously or substantially continuously monitor network resource performance characteristics 175 associated with a network segment. Once it is determined, based on the network resource performance characteristics 175 associated with the network segment, that the additional network resource (e.g., Server 4 160) is no longer needed, the control server 145 may instruct Router 1 110 and/or Router 3 150 to deconstruct the logical tunnel. In response to the deconstruction of the logical tunnel, Router 4 160 will stop advertising via the logical tunnel. As a result, Router 1 110 will no longer "see" (e.g., due to the topographical and/or geographical distance between Router 1 110 and Server 4 160) or otherwise have access to Server 4 160. Accordingly, Router 1 110 will resume routing network traffic to Server 1 115 and Server 2 120 only. Using the example above, remote network resources may be dynamically provided to a number of different network segments based on need.

In the example shown in FIG. 1B, Server 1 115 and Server 2 120 may indirectly service other network segments in the networking system 100. For example, Server 1 115 and Server 2 120 may indirectly service Network 2 130 (via Router 2 130, Router 1 110 and/or the routing infrastructure 140) and Network 3 135 (via the routing infrastructure 140). Although Server 1 115 and Server 2 120 are remote from Network 2 125, these servers are logically closest to Network 2 125 and Network 3 135.

In examples in which Server 4 160 is seen as a local resource as a result of the creation of the logical tunnel between Router 3 150 and Router 1 110, Router 2 130, Network 2 125 and/or Network 3 135 may also view Server 4 160 as a local resource. For example, Router 2 130, Network 2 125 and/or Network 3 135 may determine that Server 4 160 has the same administrative costs and/or route metrics as Server 1 115 and Server 2 120 as a result of the advertisement 165 broadcast by Server 4 160 via the logical tunnel.

Figure 1C:
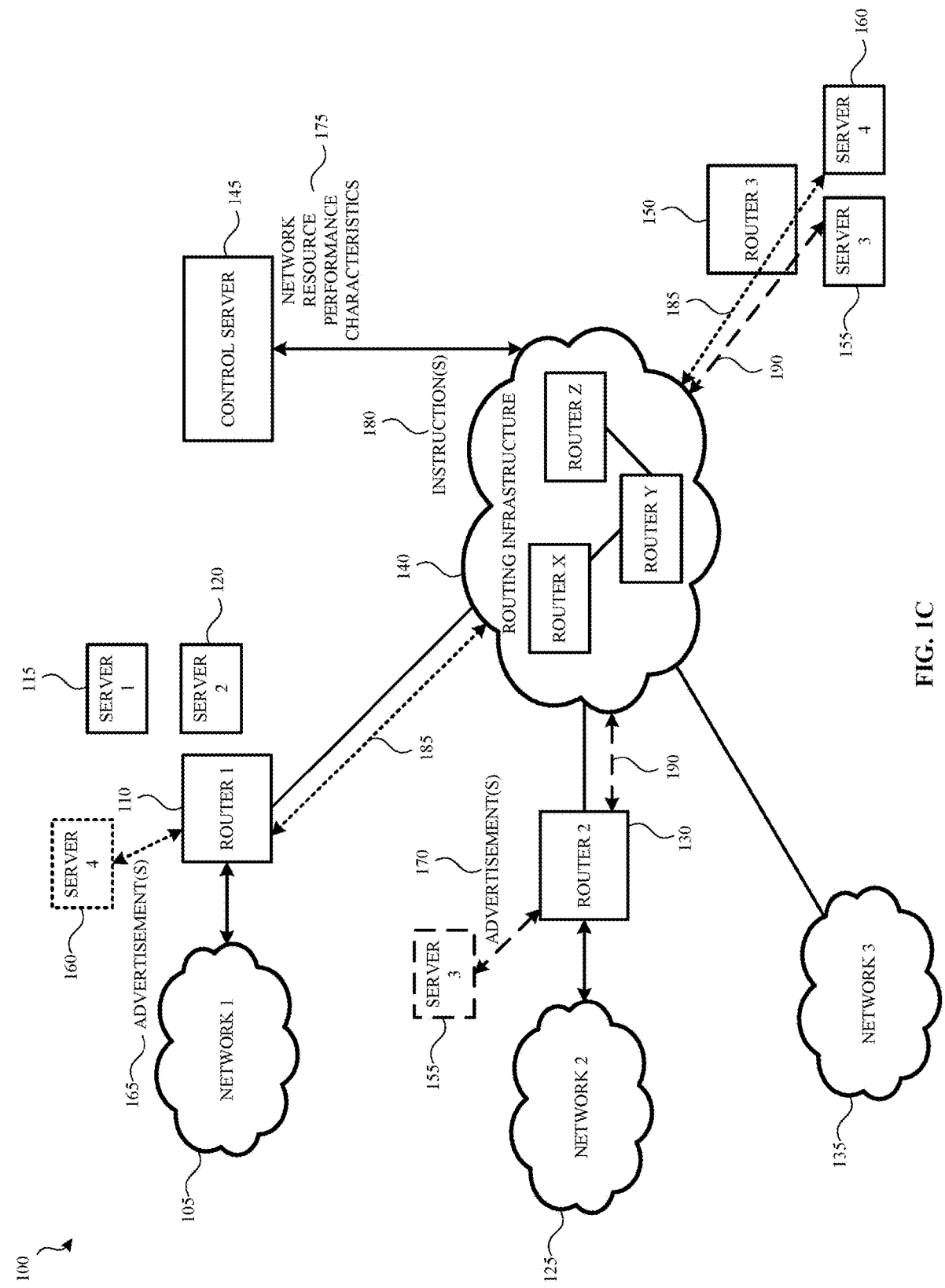
FIG. 1C illustrates the example networking system of FIG. 1B in which a second logical tunnel is constructed between a local router associated with a second network segment and the remote router to provide an additional server to the local router associated with the second network segment according to an example.

FIG. 1C illustrates the example networking system 100 of FIG. 1B in which a second logical tunnel (represented by dashed line 190) is constructed between a local router (e.g., Router 2 130) associated with a second network segment (e.g., Network 2 125) and the remote router (e.g., Router 3 150) to provide an additional server (e.g., Server 3 155) to the local router associated with the second network segment according to an example.

Like the example described with respect to FIG. 1B, the control server 145 determines, based on received network resource performance characteristics 175 associated with Network 2 125 (or based on received network resource performance characteristics 175 associated with Network 1 105), that Server 1 115 and/or Server 2 120 are not meeting minimum threshold performance metrics.

Based on this determination, the control server 145 sends an instruction 180 to Router 2 130 and/or Router 3 150 to create a logical tunnel (represented by dashed line 190) between the routers. The logical tunnel may be built using any tunneling protocol such as previously described. The logical tunnel may extend through one or more routers of the routing infrastructure 140. In the example shown in FIG. 1C, the logical tunnel enables Server 3 155 to appear to Router 2 130 and/or Network 2 125 as a local resource even though Server 3 155 may not be geographically and/or topographically close to Network 2 125. Thus, instead of routing network traffic through Server 1 115 and/or Server 2 120, network traffic for the particular IP Address (e.g., 4.2.2.2) may be routed by Router 2 130 to Server 3 155.

In an example, Router 2 130 views Server 3 155 as a local resource based on an advertisement 170 provided by Server 3 155. Like advertisement 165, advertisement 170 indicates that Server 3 155 will respond to requests for the particular IP address such as described above. When Router 2 130 receives the advertisement 170, Router 2 130 may forward this information to Network 2 125.

Router 2 130 may determine (based on administrative cost information provided by or otherwise associated with the advertisement 170) that an administrative cost associated with Server 3 155 is less than or equivalent to the administrative cost associated with Server 1 115, Server 2 120 and Server 4 160. For example, logical tunnel may enable Server 4 160 to appear to have the same administrative cost/route metric as Server 1 115 and Server 2 120. As a result, Router 2 130 may route network traffic to Server 3 115 instead of Server 1 115, Server 2 120 and/or Server 4 160.

Creation of the first logical tunnel (represented by dashed line 185) and creation of the second logical tunnel (represented by dashed line 190) may be independent of from each other. For example, network resource performance characteristics 175 associated with Network 1 105 may have no bearing on whether the second logical tunnel (represented by dashed line 190) is created. In another example, one of the logical tunnels may be created in response to received network resource performance characteristics 175. Upon further analysis of additional network resource performance characteristics 175, the control server 145 may determine that a second logical tunnel should be created to further reduce strain on various network resources (e.g., Server 1115 and Server 2 120).

Figure 1D:
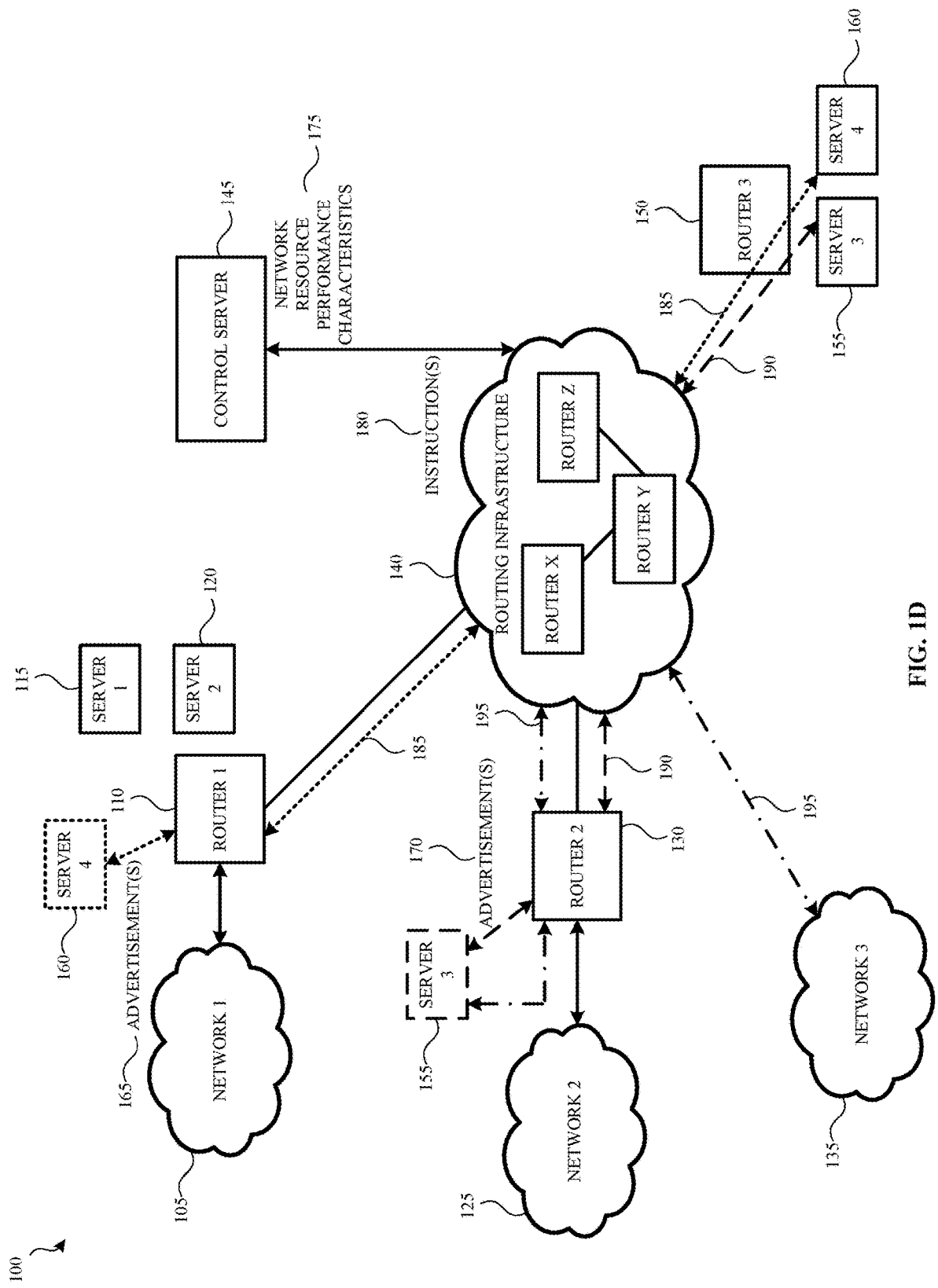
FIG. 1D illustrates the example networking system of FIG. 1C in which a third network segment accesses the additional server that is logically associated with the local router associated with the second network segment according to an example.

FIG. 1D illustrates the example networking system of FIG. 1C in which a third network segment (e.g., Network 3 135) is able to access the additional server (e.g., Server 3 155) that is logically associated with the second network segment (e.g., Network 2 125) according to an example. In this example, Network 3 135 may view (e.g., due to advertisement 170 and/or logical tunnel 190) Server 3 155 as having an equivalent (or lower) administrative cost/route metric when compared with the administrative cost associated with Server 1 115, Server 2, 120 and/or Server 4 160. As a result, Server 3 155 will indirectly serve Network 3 135 which is represented by dashed line 195.

Figure 2:
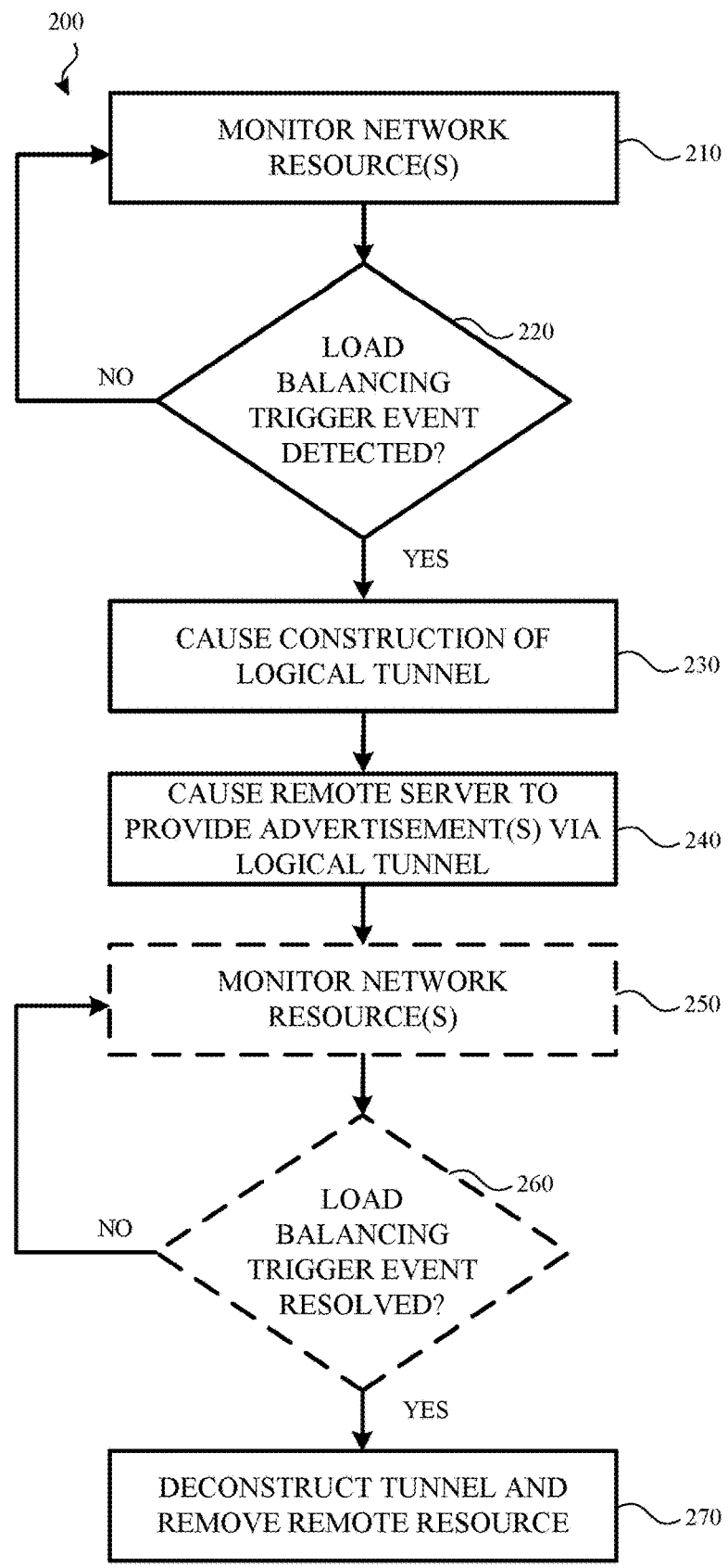
FIG. 2 illustrates a method for creating a logical tunnel in response to detecting a load balancing trigger event according to an example.

FIG. 2 illustrates a method 200 for creating logical tunnels in response to detecting a load balancing trigger event in a networking system according to an example. In an example, the networking system is an Anycast networking system. However, various types of networking systems may use the operations described herein to perform load balancing operations. In an example, method 200, or portions of method 200, may be performed by a monitoring system such as, for example, the control server 145 shown and described with respect to FIG. 1.

Method 200 begins as the monitoring system monitors (210) performance conditions of one or more network resources of the networking system. The one or more network resources may consist of one or more servers and/or one or more routers. The monitoring system may monitor performance conditions of the one or more servers associated with a network resource to determine whether the one or more servers are meeting performance conditions. For example, the performance conditions may indicate whether the one or more servers are dropping packets, are under attack, etc.

In some examples, a threshold associated with the performance conditions of network resources may vary based on a time of day. For example, the threshold may be lower during the morning when the network isn't typically busy and may be higher at a time when the network is generally operating at high capacity (e.g., in the evening). As such, load balancing trigger events may be more easily triggered in the morning when compared to the evening. In another example, the opposite may be true.

As the performance conditions are received, the performance conditions are analyzed by the monitoring system to determine or otherwise detect (220) the presence of a load balancing trigger event. Detection of a load balancing trigger event informs the monitoring system that one or more servers associated with the network resource is not meeting performance thresholds. If a load balancing trigger event is not detected, the monitoring system 210 continues to monitor (210) network resources.

However, if a load balancing trigger event is detected, the monitoring system causes construction (230) of a logical tunnel between a router (e.g., a local router) associated with the network segment and a router associated with a remote network resource (e.g., a remote router). In an example, the remote router may be part of or is otherwise associated with a server farm. The server farm may include or otherwise be associated with a number of servers (referred to as remote servers). In an example, the logical tunnel is created in response to a tunnel creation instruction provided by the monitoring system to one or both of the local router and the remote router.

Once the logical tunnel between the local router and the remote router is complete, a remote server provides (240) advertisements to the local router via the logical tunnel. In an example, the advertisement indicates to the local router that an administrative cost/route metric for using the remote server is the same as the administrative cost/route metric for using its local servers. Thus, a remote server can logically be associated with a local router in real time or substantially real time in response to current (or anticipated) network resource performance conditions.

In an example, the monitoring system may continue to monitor (250) performance conditions associated with the one or more network resources of the networking system. If the monitoring system determines (260) that the network resource(s) would fall below threshold performance metrics should the remote server be removed, the monitoring system continues to monitor (250) the network resources as described above. However, if the monitoring system determines that the network resources no longer need to utilize the remote server to route network traffic based on performance conditions, the monitoring system causes deconstruction (270) of the tunnel. As a result, the network resource will no longer route traffic through the remote server.

Figure 3:
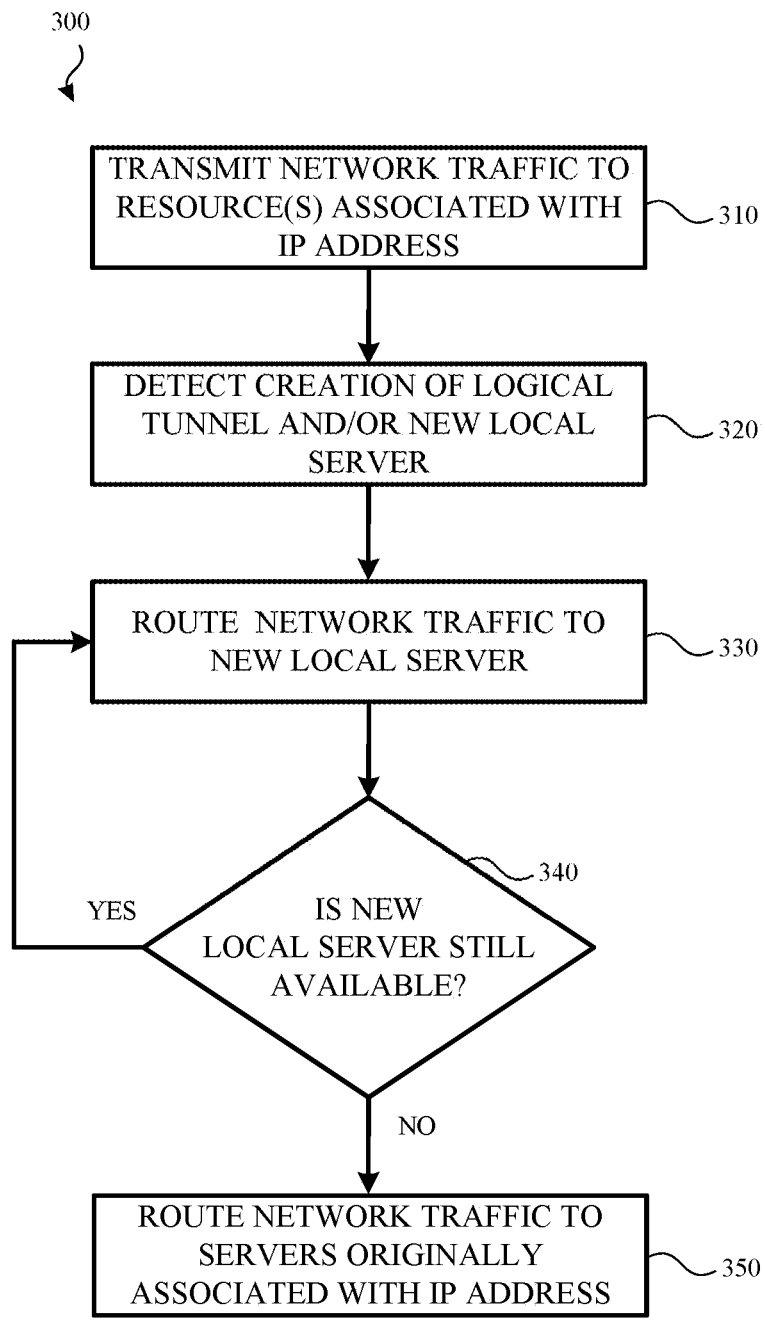
FIG. 3 illustrates a method for enabling a network segment to utilize a logically connected network resource to route network traffic according to an example.

FIG. 3 illustrates a method 300 for enabling a network resource to utilize a logically connected network resource to route network traffic according to an example. The method 300 may be performed by a network resource associated with a network segment. For example, a router (e.g., Router 2 130) associated with a network segment (e.g., Network 2 125), may be routing network traffic to one or more servers (e.g., Server 1 115 and Server 2 120) that directly service a different router (e.g., Router 1 110) and a different/remote network segment (e.g., Network 1 105). In this example, the one or more servers are indirectly servicing the router because the router does not have access to any other servers that are geographically and/or topographically closer than the one or more servers.

Method 300 begins as the router transmits (310) network traffic to network resources associated with a particular IP address. In an example, the network resources may be associated with a different network segment in the networking system. For example and referring to FIG. 1A-FIG. 1C, Server 1 115 and Server 2 120 may indirectly service requests from Router 2 130 such as explained above.

The router may detect (320) or otherwise determine (e.g., based on an advertisement received from a remote server and/or based on a tunnel creation instruction received from a monitoring system) that a new "local" server is available. For example, the monitoring system (e.g., control server 145) may cause a logical tunnel to be created between Router 2 130 and a remote router (e.g., Router 3 150) in response to detecting a load balancing trigger event associated with Server 1 115 and Server 2 120. Once the logical tunnel is created, a remote server (e.g., Server 3 155) associated with the remote router may provide an advertisement to Router 2 130 indicating that the remote server is able to service requests for the particular IP address. The advertisement may also indicate that the new local server has an administrative cost/route metric that is less than or equivalent to the administrative cost/route metric associated with Server 1 115 and Server 2 120.

In response to receiving the advertisement, the router routes (330) network traffic to the new local server. In an example, the router may route all network traffic for the particular IP address to the new local server instead of using the other servers (e.g., Server 1 115 and Server 2 120) associated with the particular IP address.

As long as the new local server is available (340), the router continues to route (330) network traffic to the new local server. However, if it is determined that the new local server is no longer available (e.g., due to a determination that the one or more remote servers are meeting performance thresholds), the logical tunnel may be deconstructed. As such, the router will no longer have access to the new local resource. The router may then revert to routing (350) network traffic to the servers originally associated with the particular IP address.

Figure 4:
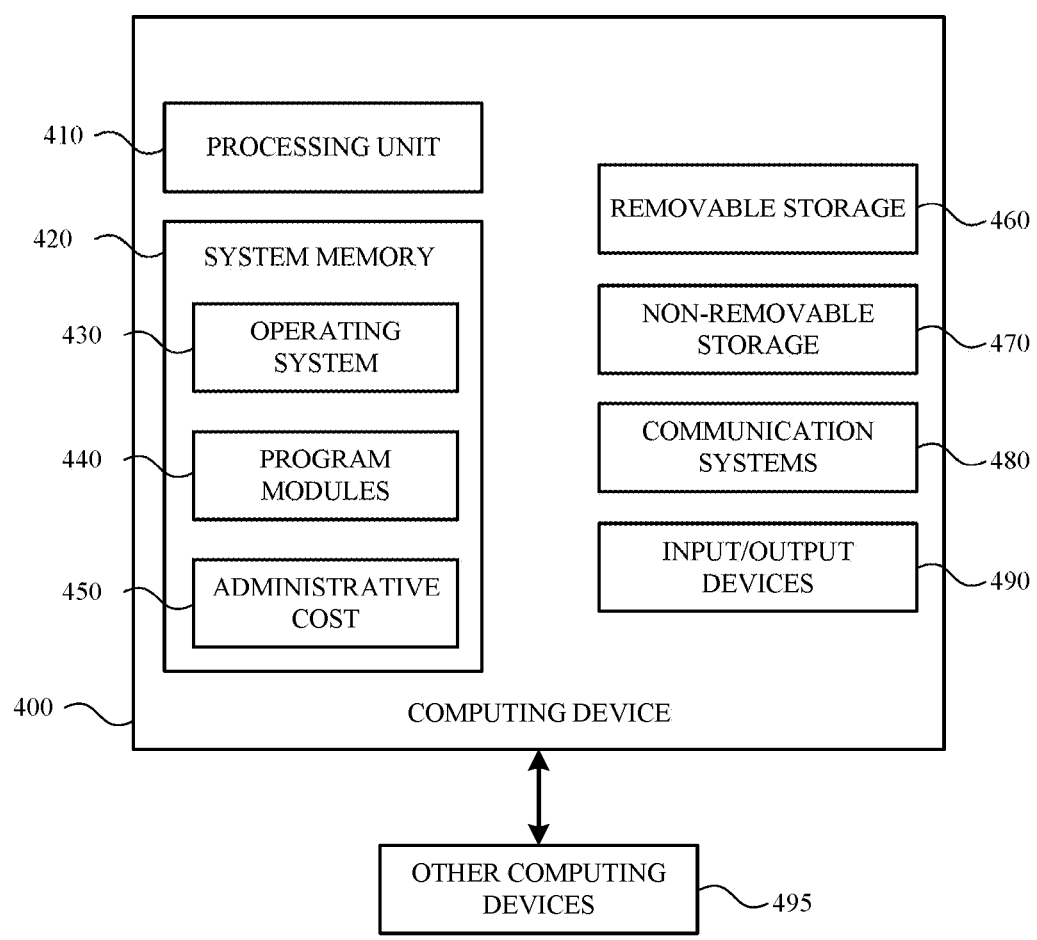
FIG. 4 is a block diagram of a computing device according to an example.

FIG. 4 is a system diagram of a computing device 400 according to an example. The computing device 400, or various components and systems of the computing device 400, may be integrated or associated with a network resource, a server, or a router. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining administrative costs 450 of utilizing various server and/or gathering and analyzing network resource performance characteristics. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routers, monitoring systems, servers and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
monitoring a network segment, the network segment being associated with a local router, the local router routing network traffic to a first server;
detecting a load balancing trigger event associated with the first server;
based on detecting the load balancing trigger event, causing creation of a logical tunnel between the local router and a remote router, the remote router being associated with a second server;
logically associating the second server with the local router; and
causing the local router to route network traffic associated with the network segment to the second remote server.

2. The method of claim 1, wherein the network segment is a first network segment, the method further comprising causing a second network segment to route network traffic via the second server instead of the first segment server.

3. The method of claim 2, wherein the second server provides an advertisement to the first network segment and the second network segment.

4. The method of claim 3, wherein the advertisement comprises an Anycast network address.

5. The method of claim 1, further comprising dismantling the logical tunnel between the local router and the remote router.

6. A system, comprising:
a network segment;
a local router associated with the network segment;
a first server associated with the local router; and
a control server configured to:
monitor at least one performance characteristic associated with the network segment; and
based on determining that the at least one performance characteristic associated with the network segment falls below a threshold:
causing creation of a logical tunnel between the local router and a remote router, the remote router being associated with a second server; and
logically associating the second server with the local router such that the local router load balances network traffic using the first server and the second server.

7. The system of claim 6, wherein the first server and the second server have at least one equivalent route metric.

8. The system of claim 7, wherein the route metric is associated with an administrative cost.

9. The system of claim 6, wherein the network resource is part of an Anycast network.

10. The system of claim 6, wherein the second server provides an advertisement to the local router.

11. The system of claim 6, wherein the control server is further configured to cause dismantling of the logical tunnel between the local router and the remote router based, at least in part, on the performance characteristics.

* * * * *